(12) United States Patent
Billon et al.

(10) Patent No.: US 12,617,325 B2
(45) Date of Patent: May 5, 2026

(54) SUPPORT DEVICE FOR AN AIRCRAFT CABIN INTERIOR LAYOUT ASSEMBLY, RELATED ASSEMBLY AND METHOD

(71) Applicant: DASSAULT AVIATION, Paris (FR)

(72) Inventors: Jean-Rémi Billon, Saint Cloud (FR); Olivier Capistran, Little Rock, AR (US); Quentin Foos, Saint Cloud (FR); Grégory Lefloch, Little Rock, AR (US)

(73) Assignee: DASSAULT AVIATION, Paris (FR)

( * ) Notice: Subject to any disclaimer, the term of this patent is extended or adjusted under 35 U.S.C. 154(b) by 181 days.

(21) Appl. No.: 18/201,539

(22) Filed: May 24, 2023

(65) Prior Publication Data

US 2023/0373630 A1      Nov. 23, 2023

(30) Foreign Application Priority Data

May 25, 2022      (FR) ................................ FR 22 05022

(51) Int. Cl.
 *B60N 3/00* (2006.01)
 *B64D 11/00* (2006.01)

(52) U.S. Cl.
 CPC ...... *B60N 3/001* (2013.01); *B64D 2011/0046* (2013.01)

(58) Field of Classification Search
 CPC ............................... B60N 3/001; B60N 3/002; B64D 2011/0046; B64D 11/00; B64D 11/0638; B64D 11/0605; A47B 1/04; A47B 17/06; A47B 17/065; A47B 5/04; A47B 5/006; A47B 83/045

USPC ......... 108/35, 42, 44, 40, 33, 137, 139, 140, 108/143, 94; 297/143, 150, 147, 135
See application file for complete search history.

(56) References Cited

U.S. PATENT DOCUMENTS 2,672,384 A * 3/1954 Richards ................ A47B 77/10
                                            312/317.1
5,452,531 A * 9/1995 Graville ................ A47B 77/10
                                            38/104

(Continued)

FOREIGN PATENT DOCUMENTS

CN      114475444      * 5/2022
CN      115230554      * 10/2022

(Continued)

OTHER PUBLICATIONS

Search Report for priority application FR 22 5022.

*Primary Examiner* — Janet M Wilkens
(74) *Attorney, Agent, or Firm* — Davidson Kappel LLC

(57) ABSTRACT
A support device for an aircraft cabin interior layout assembly comprises a fixed frame extending according to a longitudinal direction; and a table comprising a tray deployable relative to the frame between a retracted configuration and a deployed configuration. The tray extends horizontally in the retracted configuration and in the deployed configuration and is displaceable in rotation about a first axis of rotation, substantially parallel, while remaining horizontal between the retracted configuration and the deployed configuration. The tray is displaceable in translation relative to the frame in the longitudinal direction between a first position of use and a second position of use when the tray is in the deployed configuration, while being fixed in rotation about the first rotation axis.

20 Claims, 9 Drawing Sheets

(56)         References Cited

U.S. PATENT DOCUMENTS

| | | | | | |
|---|---|---|---|---|---|
| 5,632,540 | A | * | 5/1997 | Wilcox | A47B 17/065 |
| | | | | | 312/317.3 |
| 8,596,206 | B2 | * | 12/2013 | Legeay | B64D 11/0604 |
| | | | | | 297/145 |
| 11,701,990 | B1 | * | 7/2023 | Mann | B60N 3/002 |
| | | | | | 312/313 |
| 12,214,885 | B2 | * | 2/2025 | Harris | B64D 11/0606 |
| 2012/0298017 | A1 | * | 11/2012 | Chen | A47B 17/065 |
| | | | | | 108/91 |
| 2013/0248653 | A1 | * | 9/2013 | Round | B64D 11/0641 |
| | | | | | 244/118.6 |
| 2014/0300146 | A1 | * | 10/2014 | Thisius | B60N 3/004 |
| | | | | | 297/135 |
| 2016/0288911 | A1 | | 10/2016 | Hekwig et al. | |
| 2016/0376008 | A1 | | 12/2016 | Kuyper et al. | |
| 2020/0407066 | A1 | | 12/2020 | Frost et al. | |
| 2022/0135230 | A1 | | 5/2022 | Sattlerfield et al. | |

FOREIGN PATENT DOCUMENTS

| | | | | | | |
|---|---|---|---|---|---|---|
| CN | 116923221 | A | * | 10/2023 | | B60N 3/002 |
| DE | 102019118707 | A1 | * | 1/2021 | | |
| WO | 2012025674 | | * | 3/2012 | | |
| WO | WO-2015155682 | A2 | * | 10/2015 | | B64D 11/0638 |
| WO | 2021037841 | | * | 3/2021 | | |

* cited by examiner

SUPPORT DEVICE FOR AN AIRCRAFT CABIN INTERIOR LAYOUT ASSEMBLY, RELATED ASSEMBLY AND METHOD

The present disclosure relates to a support device for an aircraft cabin interior layout assembly.

BACKGROUND

Such a support device is intended to be mounted in an aircraft cabin to contribute to the comfort of the occupants of the cabin.

During a cruise flight, the passengers of an aircraft wish to have a table to perform various activities, such as working, eating, or more generally to support various objects, such as books, portable electronic devices . . . .

For safety reasons, aircraft certification requires that each table present in the aircraft be retracted during certain phases of flight, in particular in takeoff and landing.

Also in some cases, the passenger may wish to have the table retracted for his or her own comfort, in order, for example, to deploy a seat for reclining.

Known interior layout assemblies therefore comprise a side console defining a table receiving housing and a table retractable into the side console, the table extending vertically when retracted into the console.

In these assemblies, a cover mounted on the console closes the housing upward when the table is retracted.

To deploy the table, the cover is swung to the open position, and remains in the open position once the table is deployed. The table then rests on the upper portion of the side console, protruding relative to the upper portion so as to ensure a certain rigidity to the table thus deployed in particular when a force is exerted on it.

Such a support device does not give complete satisfaction on the ergonomic level. Indeed, in the deployed configuration, the table is unable to be adapted to different seating arrangements. It forms a fixed block around which the seats must be moved in a suitable manner.

Furthermore, such an assembly limits accessibility to the rear of the upper support tray, and in particular to the object support compartments that may be present at the rear of the support tray.

Moreover, such a support device is particularly bulky and is complex to integrate into the cabin while limiting its bulk. In particular, when retracted, the table occupies a large volume vertically.

SUMMARY

An aim of the present disclosure is therefore to provide a support device comprising a deployable table for an aircraft interior layout assembly, which is compact, aesthetic and modular, while presenting simple and efficient deployment kinematics.

To this end, the present disclosure concerns a support device for an aircraft cabin interior layout assembly, comprising:
- a fixed frame extending according to a longitudinal direction; and
- a table comprising a tray deployable relative to the frame between a retracted configuration and a deployed configuration, characterized in that the tray extends horizontally in the retracted configuration and in the deployed configuration and is displaceable in rotation about a first axis of rotation substantially parallel to a vertical axis while remaining horizontal between the retracted configuration and the deployed configuration; the tray being displaceable in translation relative to the frame according to the longitudinal direction between a first position of use and a second position of use when the tray is in the deployed configuration, while being fixed in rotation about the first axis of rotation.

The device according to the present disclosure may comprise one or more of the following features, taken alone or in any technically possible combination:
- the table comprises a carriage, the tray being mounted on the carriage, the carriage being mounted movable in translation according to the longitudinal direction on the frame between a first longitudinal position, in which the tray occupies the first position of use, and a second longitudinal position, wherein the tray occupies the second position of use;
- the tray extends according to the longitudinal direction in the retracted configuration and extends according to a transverse direction in the deployed configuration;
- the table further comprises a deployment arm connecting the carriage and the tray, a first articulation system and a second articulation system the deployment arm being mounted movable in rotation about a second axis of rotation substantially parallel to the vertical axis, between a stored position and a deployment position by means of the first articulation system, the deployment arm extending according to the longitudinal direction in the stored position and according to the transverse direction in the deployment position
- the tray being mounted movable in rotation on the deployment arm between the retracted configuration and the deployed configuration by means of the second articulation system;
- the table further comprises a coupling mechanism connecting the first and second articulation systems so that when the deployment arm is in the stored position, the tray is in the retracted configuration and when the deployment arm is in the deployment position, the tray is in the deployed configuration;
- the coupling mechanism comprises a cable system connecting the first and second articulation systems;
- the frame comprises a guide support guiding for the table, the table comprising a guide element configured to cooperate with the guide support to guide the tray between the retracted configuration and the deployed configuration as well as between the first and second positions of use;
- the guide element cooperates with the guide support such that the displacement of the tray in translation relative to the frame according to the longitudinal direction is permitted when the tray is in the deployed configuration and prevented otherwise, the guide element further cooperating with the guide support so that the displacement of the tray in rotation about the first axis of rotation toward the retracted configuration is allowed when the tray is in its first position of use and prevented otherwise;
- the guide support comprises a guide groove, the guide element comprising a roller configured to extend into the groove, the roller being constrained to move in the groove during the displacement of the tray between the retracted configuration and the deployed configuration and between the first and second positions of use;
- the guide groove comprises an arcuate portion and a straight portion, the roller moving in the arcuate portion to guide the tray between the retracted configuration and the deployed configuration, the arcuate portion preventing displacement of the tray in translation according to the longitudinal direction when the roller extends into the arcuate portion, the roller moving in the straight portion to guide the tray between the first and second positions of use, the straight portion preventing the displacement of the tray toward the retracted configuration when the roller extends in the straight portion;

the deployment arm carries the guide element, the guide element being configured to cooperate with the guide support to guide the deployment arm between the stored position and the deployment position;

the guide element cooperates with the guide support such that the deployment arm moves exclusively in rotation relative to the carriage about the second axis of rotation when the tray is displaced between the retracted configuration and the deployed configuration and such that the deployment arm moves exclusively in translation according to the longitudinal direction when the tray is displaced between the first position of use and the second position of use;

the device further comprises a locking mechanism comprising a locking stop mounted on the table and a complementary locking stop mounted on the frame, the stop and the complementary stop cooperating when the tray is in the retracted configuration to prevent the deployment of the tray towards the deployed configuration;

the locking stop is movable between a locking position in which it is able to cooperate with the complementary locking stop and an unlocking position in which cooperation with the complementary locking stop is avoided, the locking mechanism further comprising an actuation button mounted on the table and intended to be activated to displace the locking stop from the locking position to the unlocking position;

the fixed frame comprises a first longitudinal stop and a second longitudinal stop limiting the displacement in translation of the tray according to the longitudinal direction, the table comprising a first complementary longitudinal stop configured to cooperate with the first longitudinal stop when the tray is in the first position of use and a second complementary longitudinal stop configured to cooperate with the second longitudinal stop when the tray is in the second position of use:

the tray comprises a first half-tray and a second half-tray the second half-tray being mounted movable in rotation on the first half-tray between a folded position in which the second half-tray is held against the first half-tray and an unfolded position in which the second half-tray extends in an plane of extension of the first half-tray, the second half-tray being displaceable between the folded position and the unfolded position when the tray is in the deployed configuration, the second half-tray being locked in position in the folded position when the tray is in the retracted configuration.

The present disclosure also concerns an aircraft cabin interior layout assembly, comprising:

a console, at least one support device such as defined above, mounted in the console;

the console defining a receiving housing for receiving the at least one table opening through a deployment opening, the tray of the at least one table being deployable through the deployment opening between the retracted configuration and the deployed configuration, then being displaceable out of the housing between the first position of use and the second position of use, the frame remaining concealed in the housing in the deployed configuration.

The assembly according to the present disclosure may comprise one or more of the following features, taken alone or in any technically possible combination:

the assembly comprises at least a first and a second support device as defined above, mounted in the same console, the tray of each of the first support device and the second support device being able to be displaced between the retracted configuration and the deployed configuration, then between the first position of use and the second position of use, without contact with the tray of the other of the first support device and the second support device regardless of the position of the tray of the other of the first support device and the second support device between the retracted configuration and the deployed configuration, and then between the first position of use and the second position of use;

the assembly comprises a first seat and a second seat oriented facing the first seat, the first seat and the second seat being arranged laterally relative to the console, the console, the first seat and the second seat defining between them an intermediate space into which the deployment opening of the receiving housing opens, the tray of each of the first support device and of the second support device being able to be deployed in the intermediate space between the retracted configuration and the deployed configuration, the intermediate space is cleared when the trays of the first and second support devices are in the retracted configuration;

the tray of the first support device is able to move into the intermediate space according to the longitudinal direction, in a first direction toward the first seat, from the first position of use to the second position of use the tray of the second support device being able to move in the intermediate space according to the longitudinal direction, in a second direction toward the second seat, opposite to the first direction, from the first position of use toward the second position of use;

the tray of the first support device is able to move in the intermediate space in rotation in a first direction of rotation about a first vertical axis from the retracted configuration toward the deployed configuration, the tray of the second support device is able to move in the intermediate space in rotation in a second direction of rotation opposite to the first direction about a second vertical axis from the retracted configuration to the deployed configuration;

the first volume swept in the intermediate space by the tray of the first support device during its transition from the retracted configuration to the deployed configuration, and then during its displacement toward the first seat from the first position of use toward the second position of use, is completely separated from the second volume swept in the intermediate space by the tray of the second support device during its transition from the retracted configuration to the deployed configuration, and then during its displacement toward the second seat from the first position of use toward the second position of use;

the tray of each of the first support device and the second support device comprises a first half-tray and a second half-tray, the second half-tray being mounted, movable in rotation, on the first half-tray between a folded position in which the second half-tray is held against the first half-tray and an unfolded position in which the second half-tray extends in a plane of extension of the first half-tray the second half-tray of each of the first support device and the second support device is able to be displaced between the folded position and the unfolded position, without contact with the tray of the other of the first support device and the second support device regardless of the position of the tray of the other of the first support device and the second support device between the retracted configuration and the deployed configuration, then between the first position of use and the second position of use, and regardless of the position of the second half-tray of the other of the first support device and the second support device between the folded position and the unfolded position;

the second half-tray of the first support device pivots in a first direction of rotation toward the first seat when moving from the folded position to the unfolded position, the second half-tray of the second support device pivoting toward the second seat in a second direction of rotation opposite to the first direction of rotation during its transition from the folded position to the unfolded position;

the assembly comprises at least one cover mounted on the console, intended to laterally close the housing at the deployment opening, the cover being movable between a first configuration when the tray is in the retracted configuration and a second configuration when the tray is in the deployed configuration, the cover being intended to at least partially close the deployment opening in the first and second configurations.

The present disclosure also has as its object a method for arranging an aircraft cabin interior layout assembly, comprising the following steps:

providing a support device such as defined above, the tray occupying its retracted configuration;

transition of the tray from the retracted configuration to the deployed configuration;

only when the tray is in the deployed configuration, displacement of the tray from the first position of use to the second position of use.

BRIEF SUMMARY OF THE DRAWINGS

The present disclosure will be better understood on reading the following description, given only by way of example, and made with reference to the attached drawings, in which.

DETAILED DESCRIPTION

Figure 1:
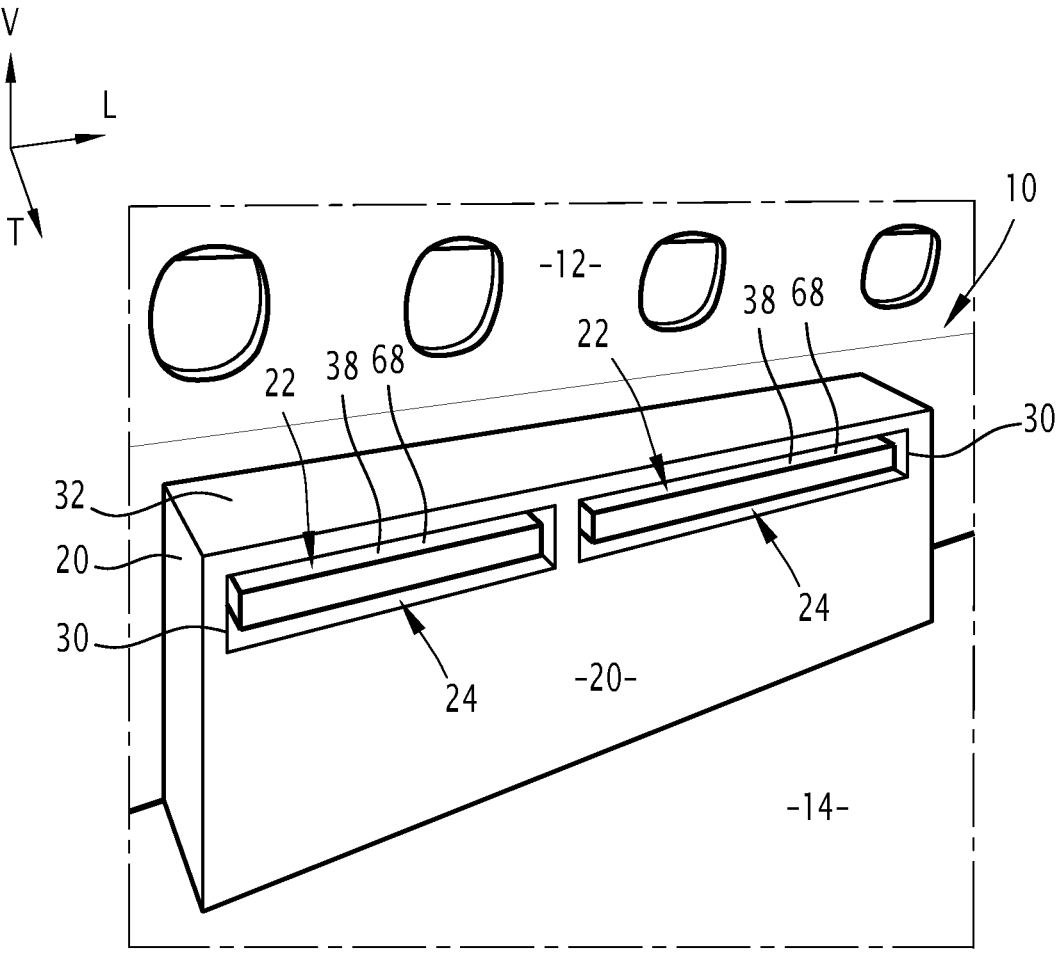
FIG. 1 illustrates an aircraft cabin interior layout assembly according to the present disclosure, comprising two support devices and a console, each tray being in the retracted configuration.
Figure 2:
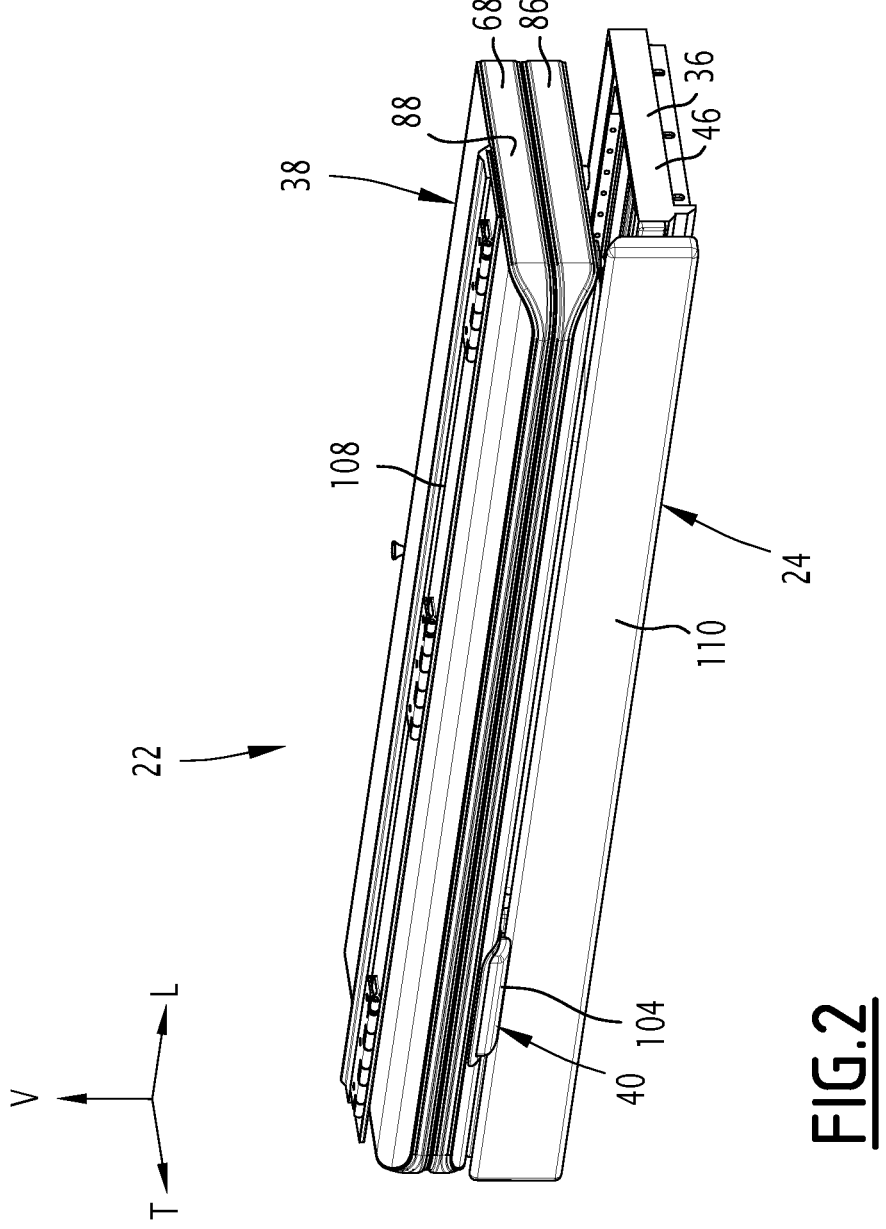
FIG. 2 is a schematic perspective representation of a support device of FIG. 1, the tray being in the retracted configuration.
Figure 3:
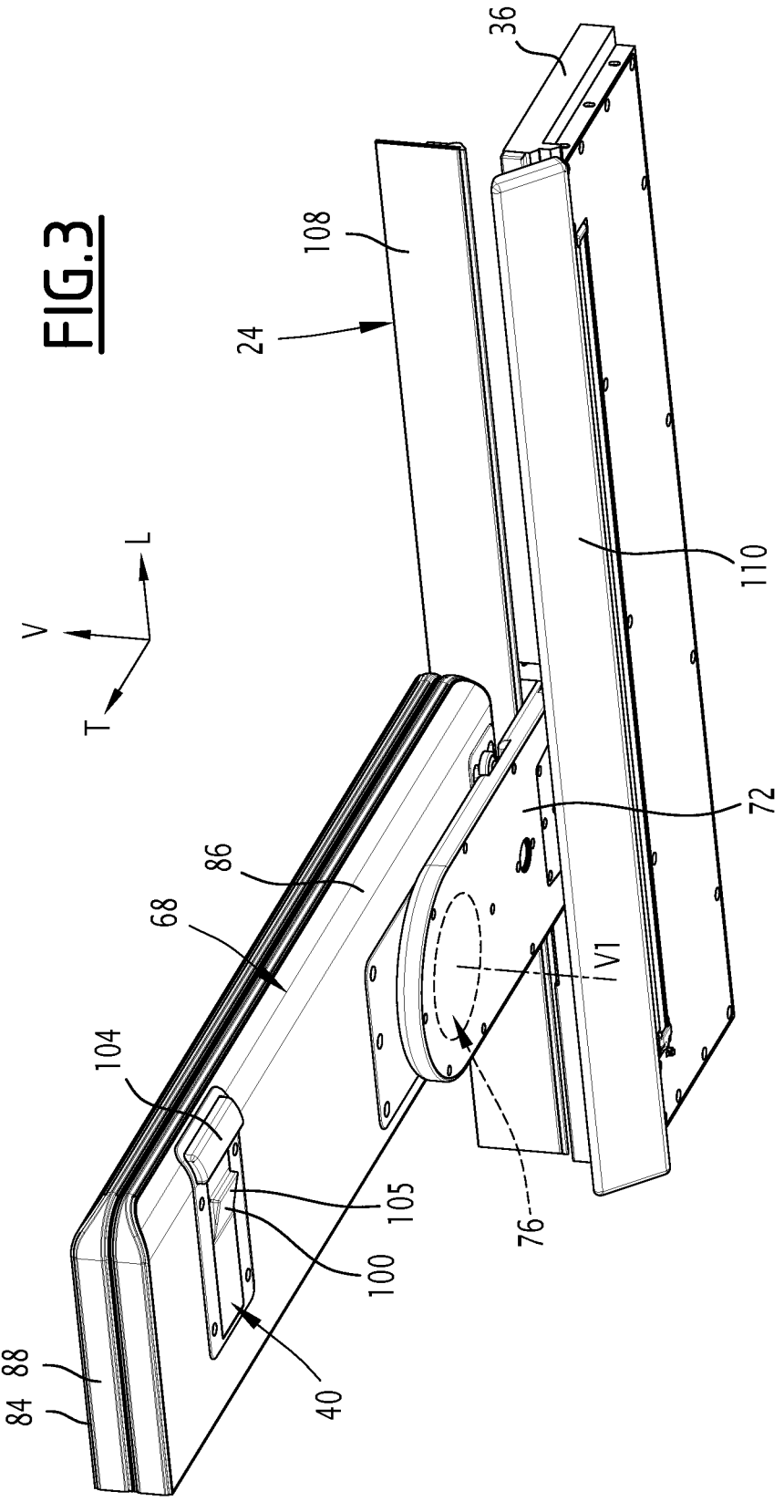
FIG. 3 is a schematic perspective view of the support device of FIG. 2, the tray being in the deployed configuration and in the first position of use, the second half-tray being in the folded position.

Throughout the following, the terms "rear" and "front" are generally understood to be relative to the deployment of the table. The term "rear" is preferably understood as closer to the table in its retracted position, while the term "front" is understood as closer to the table in its deployed position.

Furthermore, the terms "horizontal" and "vertical" are understood to mean when the aircraft is stood on the ground on a horizontal support, wings flat, with the aircraft axis horizontal.

An aircraft cabin interior layout assembly 10 according to the present disclosure is illustrated in FIGS. 1 to 9.

The aircraft cabin is delimited laterally by the aircraft fuselage 12 and downwardly by a floor 14. The cabin here extends along a longitudinal direction L.

The interior layout assembly 10 is mounted in the cabin to be accessible to the occupants of the cabin.

The assembly 10 comprises a console 20 and at least one support device 22 including, in particular, a frame 36 (see FIGS. 2 and 3) housed in the console 20 and a table 38, the table 38 comprising a tray 68 deployable relative to the frame 36 between a retracted configuration (visible in FIGS. 1, 2, and 8) and a deployed configuration (visible in FIGS. 3 to 7).

Optionally, the assembly 10 further comprises at least one cover 24 mounted on the console 20, the structure and function of which will be described in detail below.

Figure 9:
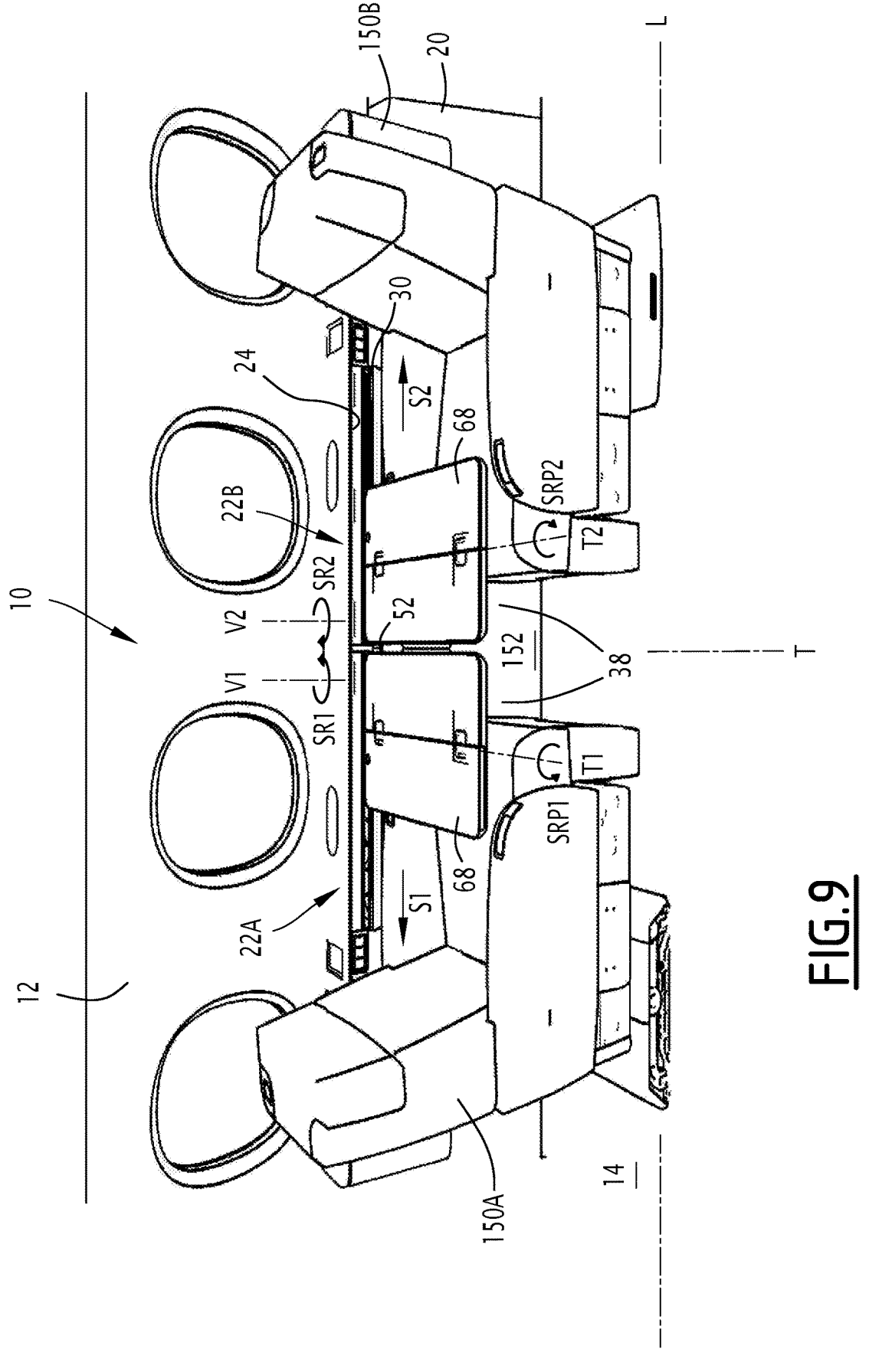
FIG. 9 is a schematic perspective view of two support devices placed in the same console between two seats in the cabin.

According to the example shown in FIG. 1 and FIG. 9, the assembly 10 comprises two support devices 22 the frames 36 of which are housed in the same console 20. The two support devices 22 are arranged one behind the other along the longitudinal direction L.

In the following, unless otherwise specified, only one support device 22 is described.

In the example shown in FIGS. 1 to 8, the console 20 extends along a horizontal main axis advantageously substantially parallel to the longitudinal direction L of the cabin, along the fuselage 12. Other configurations of orientation of the console 20 are also possible.

The console 20 delimits a receiving housing 28 for receiving the support device 22 (visible in FIGS. 6 and 7), in particular the table 38, which here opens out to the side through a deployment opening 30, visible in FIG. 1.

The receiving housing 28 is delimited laterally by the console 20 and is delimited upward by a supporting wall 32 able to support objects, such as objects belonging to the occupants of the cabin. It is further delimited at the rear by the fuselage 12 and downward by a guide support 48 for guiding the frame 36 (described in detail below).

As detailed below, each tray 68 is deployable through the deployment opening 30 between the retracted configuration and the deployed configuration, the frame 36 remaining concealed in the housing 28 in the deployed configuration.

The support device 22 comprises the fixed frame 36 arranged within the receiving housing 28 of the console 20 and the table 38. As will be described in more detail below, the tray 68 of the table 38 is deployable relative to the frame 36 between the retracted configuration and the deployed configuration and is further displaceable relative to the frame 36 between a first position of use (visible in FIG. 3) and a second position of use (visible in FIGS. 4 to 7).

Optionally, the support device further comprises a locking mechanism 40.

Figure 4:
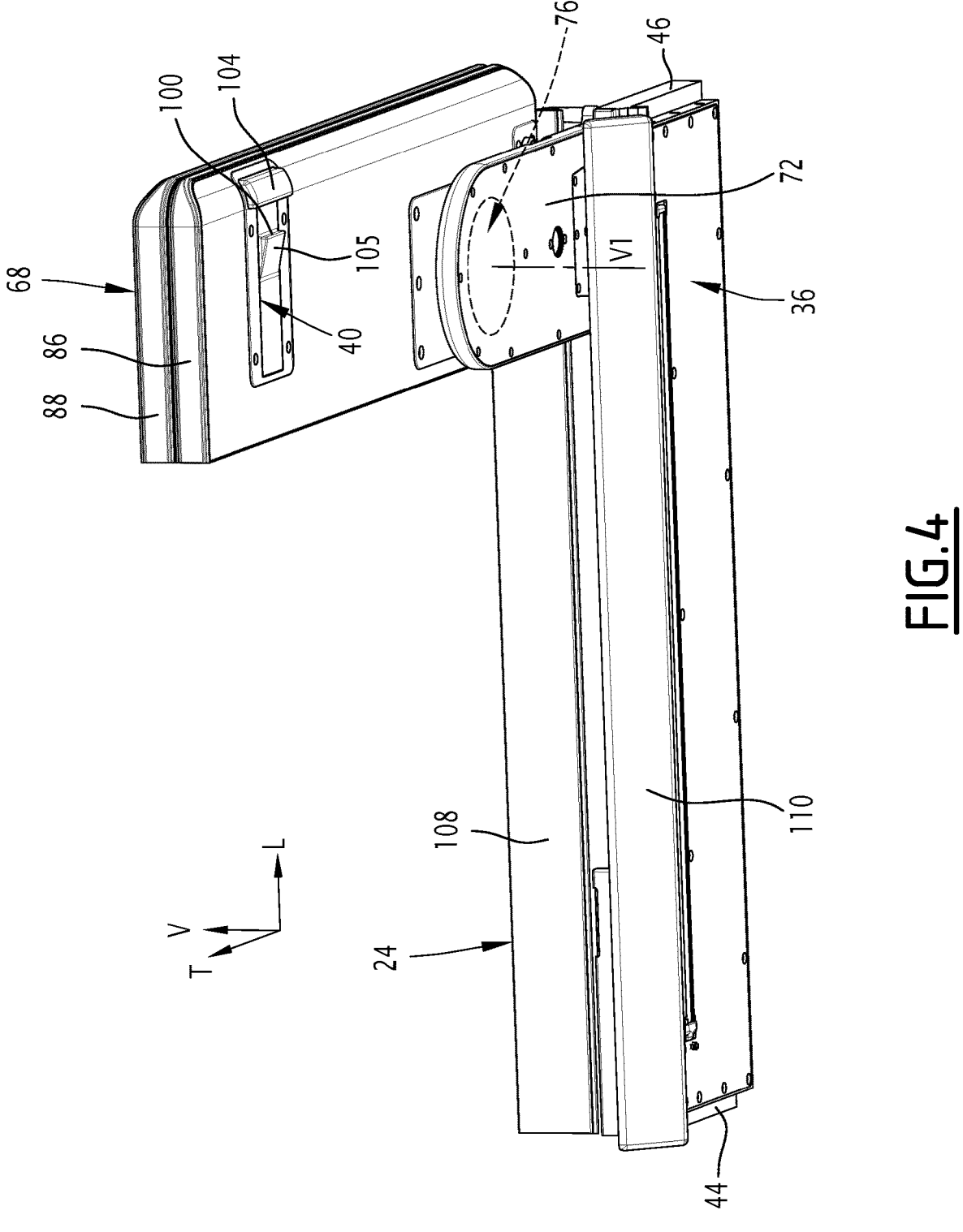
FIG. 4 is a schematic perspective view of the support device of FIG. 2, the tray being in the deployed configuration and in the second position of use, the second half-tray being in the folded position.
Figure 5:
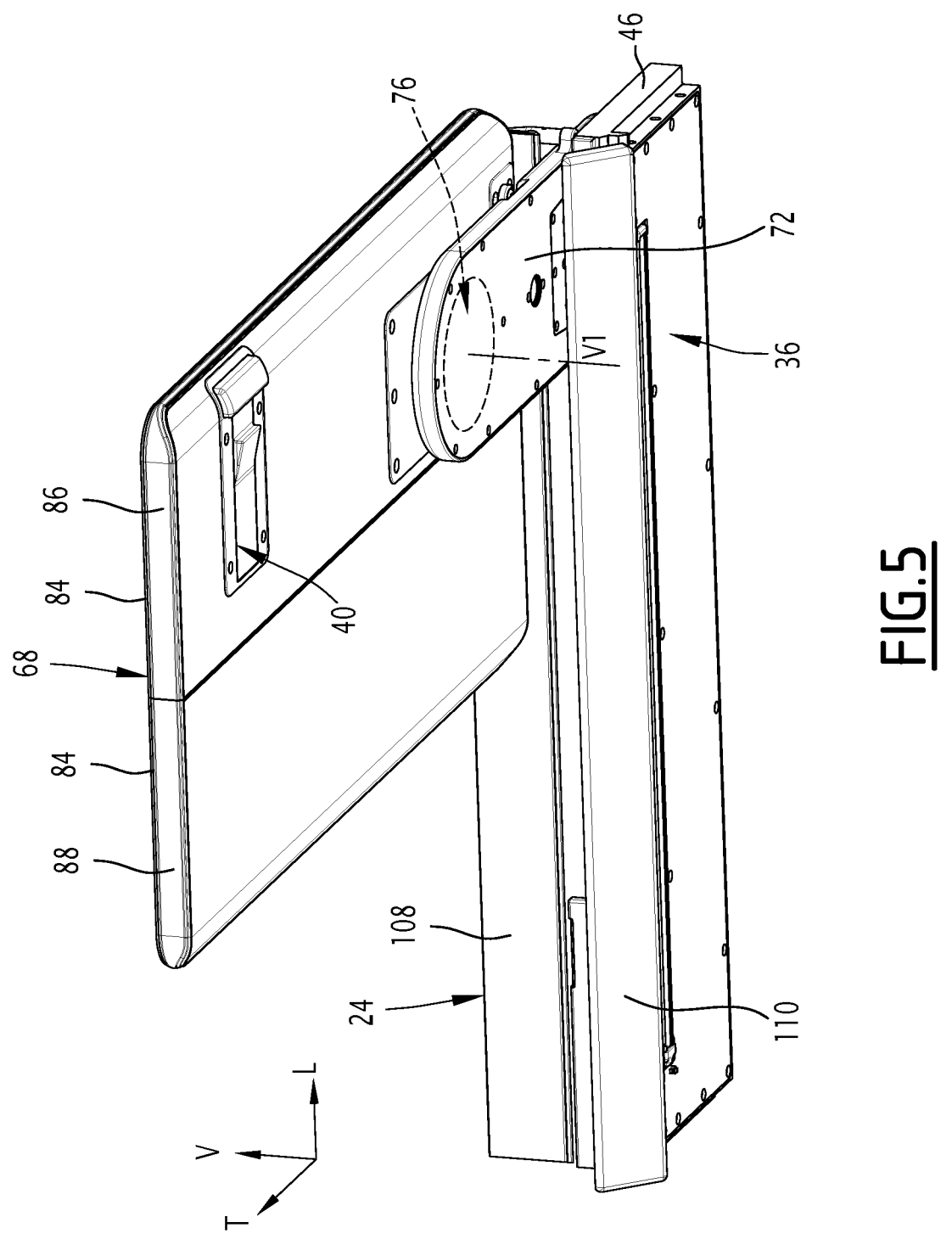
FIG. 5 is a schematic perspective view of the support device of FIG. 2, the tray being in the deployed configuration and in the second position of use, the second half-tray being in the unfolded position.
Figure 6:
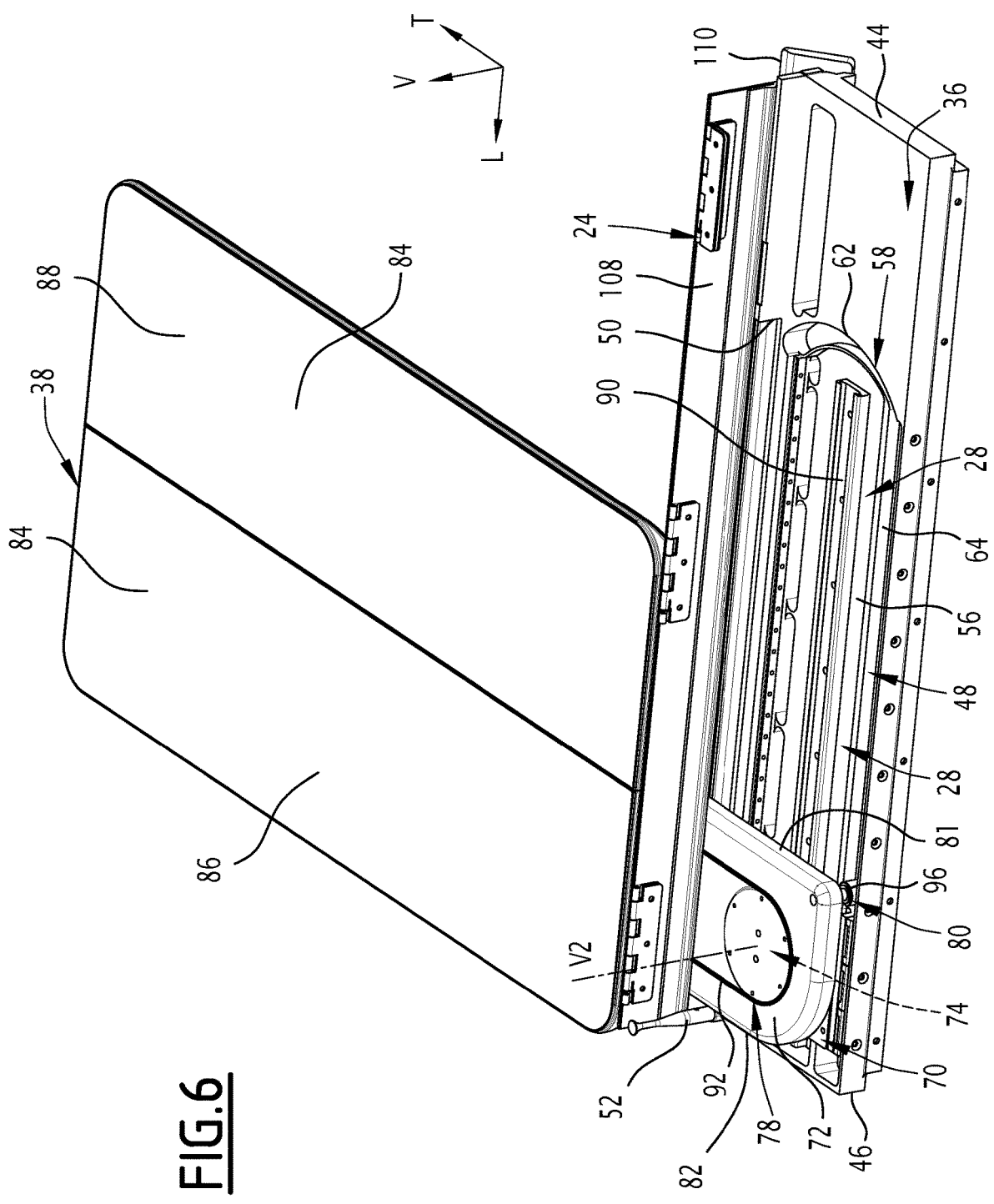
FIG. 6 is a schematic perspective view of the support device of FIG. 5, according to a different viewing angle.

With reference to FIG. 4 and FIG. 6, the frame 36 extends according to the longitudinal direction L between a first end 44 and a second end 46.

The frame 36 comprises the guide support 48 for guiding the table 38.

Advantageously, the frame 36 also comprises a first longitudinal stop 50 and a second longitudinal stop 52 intended to cooperate with the table 38 to limit the displacement of the table 38 in translation along the longitudinal direction L.

In one alternative, the frame 36 comprises only the first longitudinal stop 50, the second longitudinal stop 52 being delimited on the console 20.

In particular, as will be detailed below, the first longitudinal stop 50 is configured to cooperate with a first complementary longitudinal stop 81 of the table 38 and the second longitudinal stop 52 is configured to cooperate with a second complementary longitudinal stop 82 of the table.

The first longitudinal stop 50 and/or the second longitudinal stop 52 are arranged to prevent impact of the support device 22 of the console 20 with another support device 22 of the console 20.

With reference to FIG. 6, the guide support 48 comprises a body 56 and a guide groove 58, arranged in the body 56.

As detailed later, the guide support 48, in particular the guide groove 58, is configured to cooperate with a guide element 80 of the table 38, in particular with a roller 96, to guide the tray 68 between the retracted configuration and the deployed configuration as well as between the first and second positions of use.

Here, the body 56 extends in a horizontal plane substantially parallel to the longitudinal direction L.

The guide groove 58 is able to receive the roller 96.

With reference to FIG. 6, the guide groove 58 comprises, in the vicinity of the longitudinal end 44, an arcuate portion 62 and a straight portion 64 extending from the arcuate portion 62 toward the longitudinal end 46.

As detailed below, the arcuate portion 62 guides the displacement of the tray 68 between the retracted configuration and the deployed configuration when the roller 96 is displaced in the arcuate portion 62 and the straight portion 64 guides the displacement of the tray 68 between the first position of use and the second position of use when the roller 96 is displaced in the straight portion 64.

Notably, the arcuate portion 62 of the guide groove 58 describes a trajectory coincident with a displacement trajectory of the roller 96 when the tray 68 is displaced between the retracted configuration and the deployed configuration, and the straight portion 64 of the guide groove 58 describes a trajectory coincident with a displacement trajectory of the roller 96 when the tray 68 is displaced between the first and second positions of use.

Also, as detailed below, the arcuate portion 62 prevents the displacement in translation of the tray 68 according to the longitudinal direction L when the roller 96 extends in the arcuate portion 62, at each angular position along the arc, and the straight portion 64, prevents the angular displacement of the tray 68 toward the retracted configuration when the roller 96 extends in the straight portion 64 at each longitudinal position along the straight portion 64.

In particular, when the roller 96 extends in the arcuate portion 62, the edges of the groove 58 of the arcuate portion 62 prevent any movement of the tray 68 toward the second position of use. Furthermore, when the roller 96 extends in the straight portion 64, the edges of the groove 58 in the straight portion 64 prevent any movement of the tray 68 toward the retracted configuration, in particular by pivoting.

In addition to the tray 68, with reference to FIG. 6, the table 38 advantageously comprises a carriage 70 on which the tray 68 is mounted, a deployment arm 72 connecting the carriage 70 and the tray 68, a first articulation system 74 (visible in FIG. 6) between the carriage 70 and the deployment arm 72 and a second articulation system 76 (visible in FIGS. 3 to 5) between the deployment arm 72 and the tray 68.

Even more advantageously, the table 38 further comprises a coupling mechanism 78 connecting the first and second articulation systems 74, 76 (visible in FIG. 6).

Advantageously, the table 38 comprises the guide element 80 configured to cooperate with the guide support 48 of the frame 36.

Advantageously, the tray 68 comprises a first half-tray 86 and a second half-tray 88.

The first half-tray 86 extends according to a permanently horizontal extension plane, in other words, permanently parallel to the longitudinal direction L.

The second half-tray 88 is mounted, movable in rotation, on the first half-tray 86 between a folded position in which the second half-tray 88 is held against the first half-tray 86, in particular parallel to the extension plane of the first half-tray 86, and an unfolded position in which the second half-tray 88 extends in the extension plane of the first half-tray 86.

The second half-tray 88 is displaceable between the folded position and the unfolded position when the tray 68 is in the deployed configuration, the second half tray 88 being locked in position in the folded position when the tray 68 is in the retracted configuration.

The tray 68 comprises at least one support surface 84 intended to serve as a support for the activities of the occupants of the aircraft. Such a support surface 84 is, for example, able to receive the objects belonging to the occupants. The support surface 84 is, for example, flat.

The tray 68 extends horizontally in the retracted configuration and in the deployed configuration. Notably, the tray 68 extends substantially according to a plane that is horizontal just as well in the retracted configuration as in the deployed configuration. The support surface 84 is therefore permanently horizontal.

In particular, the tray 68 extends according to the longitudinal direction L in the retracted configuration and extends according to a transverse direction T in the deployed configuration, as illustrated in FIGS. 3 to 7.

Advantageously, in the retracted configuration, a section of the tray 68 extends along the entire length, taken according to the longitudinal direction, of the deployment opening 30, between the stops 50, 52.

The tray 68 is displaceable in rotation about a first rotation axis V1 substantially parallel to a vertical axis V while remaining horizontal between the retracted configuration and the deployed configuration.

As detailed below, the tray 68 is in particular mounted, movable in rotation, in particular about the first rotation axis V1, on the deployment arm 72 between the retracted configuration and the deployed configuration by means of the second articulation system 76.

For example, between the retracted configuration and the deployed configuration, the tray 68 rotates, relative to the deployment arm 72, by an angle between 0° and 180°, preferably substantially equal to 180°.

The tray 68 is, moreover, displaceable in translation relative to the frame 36 according to the longitudinal direction L between the first position of use and the second position of use when the tray 68 is in the deployed configuration, while being fixed in rotation about the first rotation axis V1.

The carriage 70 is mounted, movable in translation, according to the longitudinal direction L on the frame 36 between a first longitudinal position (visible in FIG. 3), in which the tray 68 occupies the first position of use, and a second longitudinal position (visible in FIGS. 4 to 7), in which the tray 68 occupies the second position of use.

For example, as shown in FIG. 6, the carriage 70 is mounted on at least one slide 90 of the frame 36, extending according to the longitudinal direction to guide the carriage 70 according to the longitudinal direction L and prevent movement of the carriage 70 according to any direction other than the longitudinal direction L.

The deployment arm 72 is mounted, movable in rotation, about a second axis of rotation V2 substantially parallel to the vertical axis V on the carriage 70 between a stored position (visible in FIGS. 1, 2 and 8) and a deployment position (visible in FIGS. 3 to 7) by means of the first articulation system 74.

The deployment arm 72 extends according to the longitudinal direction L in the stored position and according to the transverse direction T in the deployment position. For example, between the stored position and the deployment position, the deployment arm 72 rotates relative to the carriage through an angle between 0° and 90°, preferably substantially equal to 90°. The transverse direction T is for example substantially perpendicular to the longitudinal direction L.

For example, the deployment arm 72 carries the guide element 80.

The deployment arm 72 constitutes an intermediate part between the carriage 70 and the tray 28.

The first articulation system 74 ensures the articulation between the deployment arm 72 and the carriage 70.

The second articulation system 76 ensures the articulation between the deployment arm 72 and the tray 68.

The coupling mechanism 78 connects the first and second articulation systems 74, 76 such that when the deployment arm 72 is in the stored position, the tray 68 is necessarily in the retracted configuration and when the deployment arm 72 is in the deployment position, the tray 68 is necessarily in the deployed configuration.

Notably, the coupling mechanism 78 comprises a cable system 92 connecting the first and second articulation systems 74, 76.

Advantageously, the cable system 92 transmits a movement in rotation of the tray 68 relative to the deployment arm 72 about the second articulation system 76 to the first articulation system 74 so as to cause a movement in rotation of the deployment arm 72 relative to the carriage 70 about the first articulation system 74. The movement in rotation of the deployment arm 72 relative to the carriage 70 about the first articulation system 74 corresponds to a displacement of the deployment arm 72 between its stored position and its deployment position.

Notably, the cable system 92 transmits a movement in rotation of the tray 68 relative to the deployment arm 72 about the second articulation system 76 to the first articulation system 74 when the tray 68 is displaced between its retracted configuration and its deployed configuration.

The guide member 80 is configured to cooperate with the guide support 48 to guide the tray 68 between the retracted configuration and the deployed configuration and as well as between the first and second positions of use.

Notably, the guide element 80 cooperates with the guide support 48 such that the displacement of the tray 68 in translation relative to the frame 36 according to the longitudinal direction L is permitted when the tray 68 is in the deployed configuration and is prevented otherwise.

The guide element 80 furthermore cooperates with the guide support 48 so that the displacement of the tray 68 in rotation about the first rotation axis V1 toward the retracted configuration is allowed when the tray 68 is in its first position of use and is prevented otherwise.

Notably, the guide member 80 comprises the roller 96, the roller 96 being configured to extend into the guide groove 58 of the guide support 48.

The roller 96 is constrained to displace within the groove 58 during displacement of the tray 68 between the retracted configuration and the deployed configuration, as well as during displacement of the tray 68 between the first and second positions of use.

In particular, the roller 96 is displaced in the arcuate portion 62 to guide the tray 68 between the retracted configuration and the deployed configuration and in the straight portion 64 to guide the tray 68 between the first and second positions of use.

In the case where the deployment arm 72 carries the guide element 80, the guide element 80, in particular the roller 96, is configured to cooperate with the guide support 48, in particular the guide groove 58, to guide the deployment arm 72 between the stored position and the deployed position.

The guide element 80 then cooperates with the guide support 48 so that the deployment arm 72 is displaced exclusively in rotation relative to the carriage 70 about the second axis of rotation V2 when the tray 68 is displaced between the retracted configuration and the deployed configuration, and so that the deployment arm 72 is displaced exclusively in translation according to the longitudinal direction L when the tray 68 is displaced between the first position of use and the second position of use.

Advantageously, the guiding of the deployment arm 72 between the stored position and the deployment position by cooperation between the guide element 80 and the guide support 48 corresponds to the guiding of the tray 68 between the retracted configuration and the deployed configuration by cooperation between the guide element 80 and the guide support 48, due to the coupling induced by the coupling mechanism 78 between the first and second articulation systems 74, 76.

Figure 8:
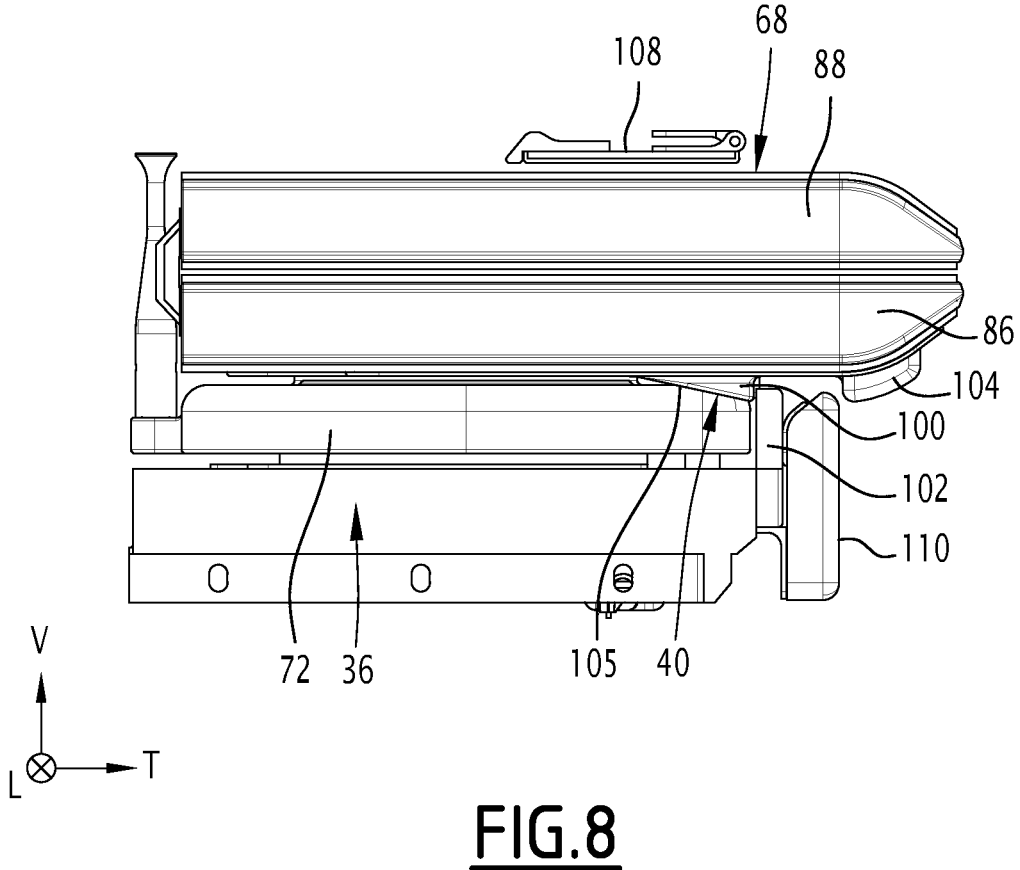
FIG. 8 is a schematic side view of the support device of FIG. 2.

With reference to FIG. 8, the locking mechanism 40 comprises a locking stop 100 mounted on the table 38 and a complementary locking stop 102 mounted on the frame 36.

The stop 100 and the complementary stop 102 cooperate when the tray 68 is in the retracted configuration to prevent the deployment of the tray 68 toward the deployed configuration.

The locking stop 100 is movable between a locking position (visible in FIG. 8) in which it is able to cooperate with the complementary locking stop 102 and an unlocking position in which any cooperation with the complementary locking stop 102 is avoided.

Advantageously, the locking mechanism 40 further comprises a locking element (not shown) displaceable between a locking configuration in which the locking element locks the second half-tray 88 in the folded position and an unlocking configuration in which the locking element releases the displacement of the second half-tray 88 from the folded position to the unfolded position.

Even more advantageously, the locking mechanism 40 further comprises an actuation button 104 mounted on the table 38, in particular on the tray 68, preferably on the first half-tray 86.

The actuation button 104 is intended to be activated to displace the locking stop 100 from the locking position to the unlocking position.

For example, the actuation button 104 is further intended to be activated to displace the locking element of the locking mechanism 40 from the locking configuration to the unlocking configuration. Then, the activation of the actuation button 104 allows to simultaneously displace the locking stop 100 from the locking position to the unlocking position and displace the locking element of the locking mechanism 40 from the locking configuration to the unlocking configuration.

Even more advantageously, the locking stop 100 comprises an inclined portion 105 configured to cooperate with the complementary locking stop 102 to allow the displacement of the locking stop 100 to the unlocked position when the tray 68 is returned to its retracted configuration, and thus allow the transition of the tray 68 from the deployed configuration to the retracted configuration.

Advantageously, the table 38 further comprises the first complementary longitudinal stop 81 configured to cooperate with the first longitudinal stop 50 when the tray 68 is in the first position of use and the second complementary longitudinal stop 82 is configured to cooperate with the second longitudinal stop 52 when the tray 68 is in the second position of use.

Figure 7:
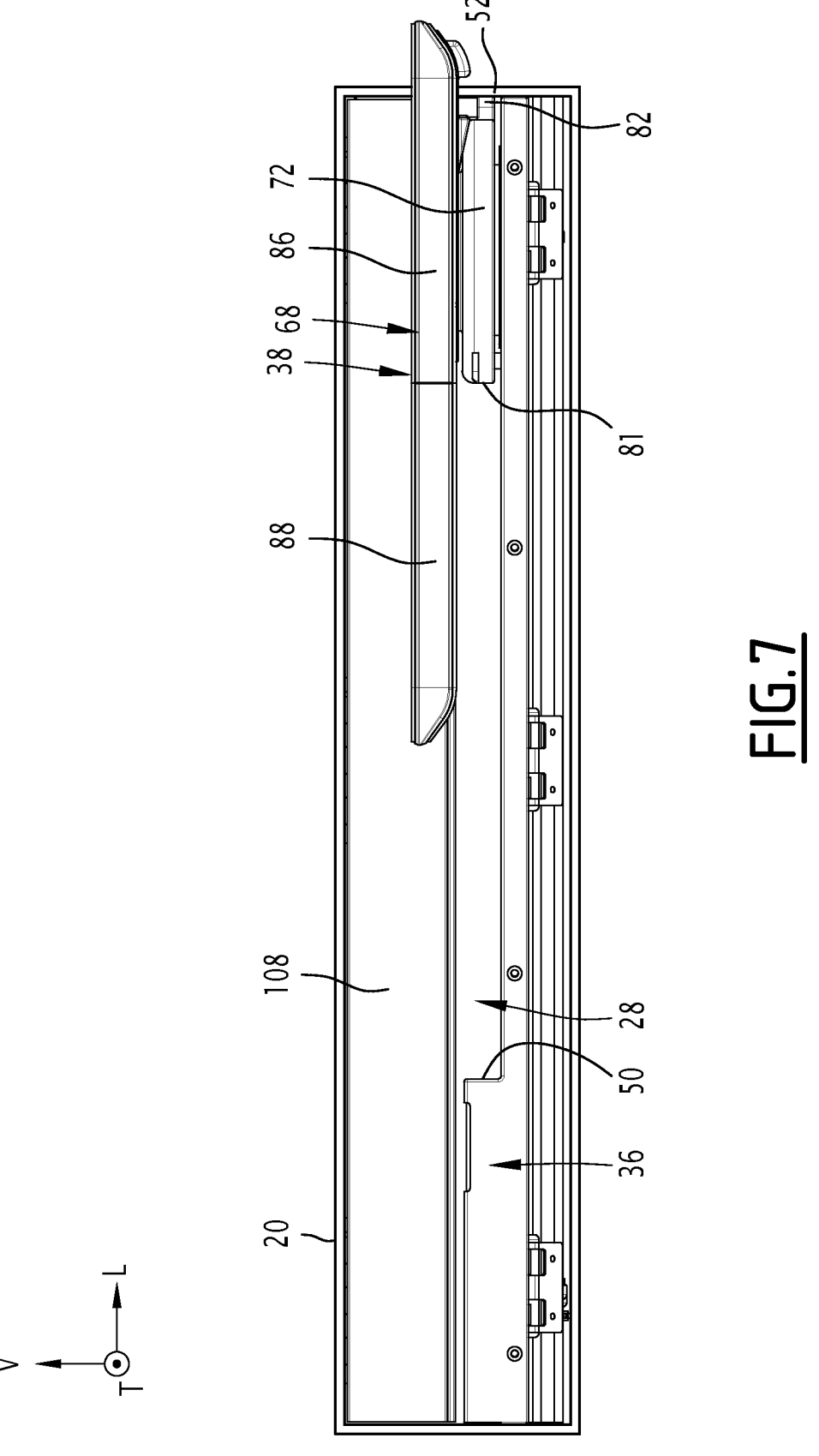
FIG. 7 is a schematic front view of the support device of FIG. 5.

According to the example shown in FIG. 7, the first and second complementary longitudinal stops 81, 82 are defined on the deployment arm 72.

The cover 24 is intended to laterally close, at least partially, the housing 28 at the deployment opening 30. In particular, the cover 24 is movable between a first configuration when the tray 68 is in the retracted configuration and a second configuration when the tray 68 is in the deployed configuration. Notably, the cover 24 is intended to at least partially, preferably completely, close off the deployment opening 30 in the retracted and deployed configurations of the tray 68.

In the example of the figures, the cover 24 comprises an upper flap 108 and a lower flap 110.

The upper flap 108 is hinged to the console 20 about an axis of articulation. Advantageously, the axis of articulation is parallel to the longitudinal direction L. The axis of articulation of the upper flap 108 extends above the deployment opening 30.

The upper flap 108 is displaceable in rotation about its axis of articulation between a spread position (visible in FIGS. 2 and 8) in which it is held against the console 20 and extends horizontally and a closing position (visible in FIGS. 3 to 7) in which it extends vertically through the deployment opening 30 to at least partially close the deployment opening 30. In particular, the upper flap 108 is in its spread position when the tray 68 is in its retracted configuration and is in its closing position when the tray 68 is in its deployed configuration. Thus, in the deployed configuration, the upper flap 108 conceals the housing 28.

The lower flap 110 is hinged to the frame 36 about an axis of articulation. Advantageously, the axis of articulation is also parallel to the longitudinal direction L. The axis of articulation of the lower flap 110 extends below the deployment opening 30.

The lower flap 110 is displaceable in rotation about its axis of articulation between a rest position in which it extends vertically toward the deployment opening 30 to at least partially close off the deployment opening 30 and a spread position in which it is inclined away from the deployment opening 30 to provide a space to allow the displacement of the deployment arm 72 from its stored position toward its deployment position. In particular, the lower flap 110 is in its rest position when the deployment arm 72 is in its stored position and is in its spread position when the deployment arm 72 is in its deployment position. Thus, in the stored position, in other words, when the tray 68 is in its retracted configuration, the lower flap 110 conceals the deployment arm 72. As seen in FIGS. 3 to 6, in the spread position, although it is inclined away from the deployment opening 30, the lower flap 110 still at least partially closes the deployment opening 30, even though the closure is less than when the lower flap 110 is in its rest position. For example, in the spread position, that is, in the deployed configuration of the tray, the frame 36 is hidden, in particular by the lower flap 110.

In FIG. 7, the lower flap 110 has been omitted.

According to the example shown in the figures, when the cover 24 is in its first configuration (FIGS. 2 and 8), the upper flap 108 is in its spread position and the lower flap 110 is in its rest position. In this first configuration, the upper flap 108 is held against the console 20 and the lower flap 110 extends vertically toward the deployment opening 30 to at least partially close the deployment opening 30. When the cover 24 is in its second configuration (FIGS. 3 to 7), the upper flap 108 is in its closed position and the lower flap 110 is in its spread position, in other words, the upper flap 108 extends vertically through the deployment opening 30 to at least partially close the deployment opening 30 and the lower flap 110 is inclined away from the deployment opening 30 to provide a space to allow displacement of the deployment arm 72 from its stored position toward its deployed position.

According to the example illustrated in the figures, the tray 68 is engaged through the deployment opening 30 in the retracted configuration and extends entirely outside the housing 28, without extending through the deployment opening 30, in the deployed configuration.

In the following, a method for an aircraft cabin interior layout is described.

The method initially comprises providing the interior layout assembly of the aircraft cabin, in particular the support device 22.

The tray 68 is then considered to be in its retracted configuration.

When an occupant wishes to use the support device 22, the occupant switches the tray 68 from the retracted configuration to the deployed configuration.

In particular, the occupant then activates the actuation button 104 to move the locking stop 100 to its unlocked position in order to release the deployment of the tray 68 to its deployed configuration.

Advantageously, the occupant then drives the tray 68 in rotation about the first axis of rotation V1 on the deployment arm 72 from the retracted configuration to the deployed configuration, about the second articulation system 76.

Even more advantageously, during the displacement of the tray 68 from the retracted configuration to the deployed configuration, the deployment arm 72 is driven in rotation about the second axis of rotation V2 on the carriage 70 from the stored position and the deployment position, about the first articulation system 74. In particular, the rotational driving of the deployment arm results from the effect of the coupling mechanism 78, in particular the cable system connecting the first and second articulation systems 74, 76.

During the displacement of the tray 68 from the retracted configuration to the deployed configuration, the guide element 80 cooperates with the arcuate portion 62 of the guide support 48, so that the displacement of the tray 68 in translation relative to the frame 36 according to the longitudinal direction L is prevented.

Advantageously, when the tray 68 reaches the deployed configuration, the displacement of the tray 68 in translation relative to the frame 36 according to the longitudinal direction L is allowed. During this displacement, the guide element 80 remains in the straight portion 64, forcing the tray 68 to remain in the deployed configuration.

Only when the tray 68 is in the deployed configuration, the occupant displaces the tray 68 between the first position of use to the second position of use.

During the displacement of the tray 68 from the first position of use toward the second position of use, the guide element 80 cooperates with the guide support 48 such that the displacement in rotation of the tray 68 about the first axis of rotation V1 toward the retracted configuration is prevented.

Advantageously, the displacement of the tray 68 in rotation about the first axis of rotation V1 toward the retracted configuration is permitted when the tray 68 is in the first position of use.

The occupant then displaces the tray 68 between the first position of use and the second position of use, into the position that suits him.

Advantageously, when desired, the occupant activates the actuation button 104 to move the locking element of the locking mechanism 40 to its unlocked configuration in order to release the displacement of the second half-tray 88 from the folded position to the unfolded position. The occupant can then displace the second half-tray 88 to the unfolded position.

When the occupant wishes to store the tray 68, the occupant displaces the second half-tray 88 to the folded position if necessary and then displaces the tray 68 first to the first position of use and then from the deployed configuration to the retracted position.

When the tray 68 reaches the retracted configuration, the locking stop 100 again cooperates with the complementary locking stop 102 to lock the tray 68 in the retracted configuration.

Thanks to the present disclosure, an occupant of the cabin can adapt the arrangement of the table 38 as desired, by displacing the tray 68 between the first position of use and the second position of use when they wish to use the table 38 and by storing the tray 68 from the deployed configuration to the retracted configuration when they wish to store the tray 68.

In addition, the support device 22 according to the present disclosure allows free access to the support wall 32 of the console even when the tray is in the deployed configuration.

Also, thanks to the present disclosure, any collision of the tray 68 with the console 20 is avoided, in particular because the tray 68 cannot be positioned at an angle relative to the console 20.

Similarly, any collision between two trays 68 of the same console 20 is avoided, in particular thanks to the longitudinal stops 50 and 52.

This is illustrated in particular by FIG. 9. As seen in this figure, the interior layout assembly 10 comprises a first seat 150A and a second seat 150B facing the first seat 150A in the longitudinal direction L The first seat 150A and the second seat 150B are arranged laterally relative to the console 20.

The interior layout assembly 10 includes two support devices 22A, 22B mounted in the same console 20 and associated with each seat 150A, 150B, respectively.

The console 20, the first seat 150A, and the second seat 150B define between them an intermediate space 152 into which the deployment opening 30 of the receiving housing 28 opens.

The trays 68 of each of the first support device 22A and the second support device 22B are able to be deployed into the intermediate space 152 between the retracted configuration and the deployed configuration, as described above.

The tray 68 of the first support device 22A is able to move in the intermediate space 152 in a first direction of rotation SR1, about a first vertical axis V1 from the retracted configuration to the deployed configuration. Conversely, the tray 68 of the second support device 22B is able to move in the intermediate space 152 in rotation in a second direction of rotation SR2 opposite to the first direction SR1 about a second vertical axis V2 from the retracted configuration toward the deployed configuration.

Furthermore, once in the deployed configuration, the tray 68 of the first support device 22A is able to displace in the intermediate space 152, in a first direction S1 toward the first seat 150A according to the longitudinal direction L, from the first position of use towards the second position of use.

Likewise, once in the deployed configuration, the tray 68 of the second support device 22B is able to displace in the intermediate space 152, in a second direction S2 toward the second seat 150B according to the longitudinal direction L, opposite to the first direction S1, from the first position of use toward the second position of use.

In their first position of use, visible in FIG. 9, the trays 68 of the support devices 22A, 22B extend parallel to each other, in the transverse direction T, adjacent to each other, without contact with each other. They are kept separate by the stop 52 interposed between their deployment arms 72 (not visible in FIG. 9). This stop 52 is advantageously common to both support devices 22A, 22B.

The trays 68 of the support devices 22A, 22B move away from each other while remaining parallel, to transition into their second position of use.

Thus, the first volume swept in the intermediate space 152 by the tray 68 of the first support device 22A as it transits from the retracted configuration to the deployed configuration, and then during its displacement toward the first seat 150A, from the first position of use toward the second position of use is completely disconnected from the second volume swept in the intermediate space 152 by the tray 168 of the second support device 22B when it transitions from the retracted configuration to the deployed configuration, and then when it moves toward the second seat 150B, from the first position of use toward the second position of use.

In this way, the tray 68 of each of the first support device 22A and the second support device 22B is able to be displaced between the retracted configuration and the deployed configuration, and then between the first position of use and the second position of use, without contact or interference with the tray 68 of the other of the first support device 22A and the second support device 22B, regardless of the position of the tray 68 of the other of the first support device 22 and the second support device 22 between the retracted configuration and the deployed configuration, and then between the first position of use and the second position of use.

Thus, the users of each of the support devices 22A, 22B, who occupy the seats 150A, 150B, respectively, can maneuver their respective support devices 22A, 22B completely independently of each other, without any interference.

Furthermore, in the case where the tray 68 of each of the first support device 22A and the second support device 22B comprises a first half-tray 86 and a second half-tray 88, movable in rotation between a folded position and an unfolded position, the axes of rotation T1, T2 of the second half-trays 88 are parallel to the transverse direction T for any position of the tray 68 between the first position of use and the second position of use.

The second half-tray 88 of the first support device 22A is able to pivot in a first direction of rotation SRP1 toward the first seat 150A during transition from the folded position to the unfolded position. The second half-tray 88 of the second support device 22B is able to pivot toward the second seat 150B in a second direction of rotation SRP2 opposite to the first direction of rotation SRP1 as it transitions from the folded position to the unfolded position.

Thus, each second half-tray 88 of one support device 22A, 22B is able to be displaced between the folded position and the unfolded position, without contact with the tray 68 of the other support device 22B, 22A. This is the case regardless of the position of the tray 68 of the other support device 22B, 22A between the retracted configuration and the deployed configuration, and then between the first position of use and the second position of use. This is also the case regardless of the position of the second half-tray 88 of the other support device 22B, 22A between the folded position and the unfolded position.

As previously indicated, the operation of each of the support devices 22A, 22B is therefore completely independent of and without interference from the operation of another adjacent support device 22A, 22B in the same intermediate space 152 between two seats 150A, 150B.

What is claimed is:

1. A support device for an aircraft cabin interior layout assembly, comprising:

a fixed frame extending according to a longitudinal direction; and a table comprising a tray deployable relative to the frame between a retracted configuration and a deployed configuration, wherein the tray extends horizontally in the retracted configuration and in the deployed configuration and is displaceable in rotation about a first axis of rotation substantially parallel to a vertical axis while remaining horizontal between the retracted configuration and the deployed configuration;

the tray being displaceable in translation relative to the frame according to the longitudinal direction between a first position of use and a second position of use when the tray is in the deployed configuration, while being fixed in rotation about the first axis of rotation, the table further comprising a deployment arm and a carriage, the deployment arm connecting the carriage and the tray, a first articulation system and a second articulation system, the deployment arm being mounted movable in rotation about a second axis of rotation substantially parallel to the vertical axis on the carriage between a stored position and a deployment position by means of the first articulation system, the deployment arm extending according to the longitudinal direction in the stored position and according to a transverse direction in the deployment position, the tray being mounted movable in rotation on the deployment arm between the retracted configuration and the deployed configuration by means of the second articulation system.

2. The device according to claim 1, wherein the tray is mounted on the carriage, the carriage is mounted movable in translation according to the longitudinal direction on the frame between a first longitudinal position, in which the tray occupies the first position of use, and a second longitudinal position, wherein the tray occupies the second position of use.

3. The device according to claim 2, wherein the tray extends according to the longitudinal direction in the retracted configuration and extends according to the transverse direction in the deployed configuration.

4. The device according to claim 1, wherein the table further comprises a coupling mechanism connecting the first and second articulation systems such that when the deployment arm is in the stored position, the tray is in the retracted configuration and when the deployment arm is in the deployment position, the tray is in the deployed configuration.

5. The device according to claim 4, wherein the coupling mechanism comprises a cable system connecting the first and second articulation systems.

6. The device according to claim 1, wherein the frame comprises a guide support for guiding the table, the table comprising a guide element configured to cooperate with the guide support to guide the tray between the retracted configuration and the deployed configuration as well as between the first and second positions of use.

7. The device according to claim 6, wherein the guide element cooperates with the guide support such that displacement of the tray in translation relative to the frame according to the longitudinal direction is permitted when the tray is in the deployed configuration and prevented otherwise, the guide element further cooperating with the guide support so that the displacement of the tray in rotation about the first axis of rotation toward the retracted configuration is allowed when the tray is in its first position of use and prevented otherwise.

8. The device according to claim 7, wherein the guide support comprises a guide groove, the guide element comprising a roller configured to extend into the groove, the roller being constrained to move in the groove during the displacement of the tray between the retracted configuration and the deployed configuration as well as between the first and second positions of use.

9. The device according to claim 8, wherein the guide groove comprises an arcuate portion and a straight portion, the roller moving in the arcuate portion to guide the tray between the retracted configuration and the deployed configuration, the arcuate portion preventing displacement of the tray in translation according to the longitudinal direction when the roller extends into the arcuate portion, the roller moving in the straight portion to guide the tray between the first and second positions of use, the straight portion preventing the displacement of the tray toward the retracted configuration when the roller extends in the straight portion.

10. The device according to claim 6, wherein, the tray being mounted on the carriage, the carriage being mounted movable in translation according to the longitudinal direction on the frame between a first longitudinal position, in which the tray occupies the first position of use, and a second longitudinal position, wherein the tray occupies the second position of use, wherein the tray extends according to the longitudinal direction in the retracted configuration and extends according to a transverse direction in the deployed configuration, wherein the deployment arm carries the guide element, the guide element being configured to cooperate with the guide support to guide the deployment arm between the stored position and the deployment position.

11. The device according to claim 10, wherein the guide element cooperates with the guide support such that the deployment arm moves exclusively in rotation relative to the carriage about the second axis of rotation when the tray is displaced between the retracted configuration and the deployed configuration, and such that the deployment arm moves exclusively in translation according to the longitudinal direction when the tray is displaced between the first position of use and the second position of use.

12. The device according to claim 1, further comprising a locking mechanism comprising a locking stop mounted on the table and a complementary locking stop mounted on the frame, the stop and the complementary stop cooperating when the tray is in the retracted configuration to prevent deployment of the tray towards the deployed configuration.

13. The device according to claim 12, wherein the locking stop is movable between a locking position in which it is configured to cooperate with the complementary locking stop and an unlocking position in which cooperation with the complementary locking stop is avoided, the locking mechanism further comprising an actuation button mounted on the table and intended to be activated to displace the locking stop from the locking position to the unlocking position.

14. The device according to claim 1, wherein the fixed frame comprises a first longitudinal stop and a second longitudinal stop limiting the displacement of the tray in translation according to the longitudinal direction, the table comprising a first complementary longitudinal stop configured to cooperate with the first longitudinal stop when the tray is in the first position of use and a second complementary longitudinal stop configured to cooperate with the second longitudinal stop when the tray is in the second position of use.

15. The device according to claim 1, wherein the tray comprises a first half-tray and a second half-tray, the second half-tray being mounted movable in rotation on the first half-tray between a folded position in which the second half-tray is held against the first half-tray and an unfolded position in which the second half-tray extends in a plane of extension of the first half-tray, the second half-tray being displaceable between the folded position and the unfolded position when the tray is in the deployed configuration, the second half-tray being locked in position in the folded position when the tray is in the retracted configuration.

16. An aircraft cabin interior layout assembly, comprising:
a console,
at least one of the support device according to claim 1, mounted in the console;
the console defining a receiving housing for receiving the table, opening through a deployment opening, the tray of the at least one table being deployable through the deployment opening between the retracted configuration and the deployed configuration, and then being displaceable out of the receiving housing between the first position of use and the second position of use, the frame remaining concealed in the receiving housing in the deployed configuration.

17. The interior layout assembly according to claim 16, wherein the at least one support device includes a first support device and a second support device, mounted in the console, the tray of each of the first support device and the second support device being configured to be displaced between the retracted configuration and the deployed configuration, then between the first position of use and the second position of use, without contact with the tray of the other of the first support device and the second support device regardless of the position of the tray of the other of the first support device and the second support device between the retracted configuration and the deployed configuration, and then between the first position of use and the second position of use.

18. A method for arranging an aircraft cabin interior layout assembly, comprising:
providing the support device according to claim 1, the tray occupying its retracted configuration;
transitioning the tray from the retracted configuration to the deployed configuration;
only when the tray is in the deployed configuration, displacing the tray from the first position of use to the second position of use.

19. A support device for an aircraft cabin interior layout assembly, comprising:
a fixed frame extending according to a longitudinal direction; and
a table comprising a tray deployable relative to the frame between a retracted configuration and a deployed configuration, wherein the tray extends horizontally in the retracted configuration and in the deployed configuration and is displaceable in rotation about a first axis of rotation substantially parallel to a vertical axis while remaining horizontal between the retracted configuration and the deployed configuration;
the tray being displaceable in translation relative to the frame according to the longitudinal direction between a first position of use and a second position of use when the tray is in the deployed configuration, while being fixed in rotation about the first axis of rotation,
wherein the frame comprises a guide support for guiding the table, the table comprising a guide element configured to cooperate with the guide support to guide the tray between the retracted configuration and the deployed configuration as well as between the first and second positions of use,
wherein the table comprises a carriage, the tray being mounted on the carriage, the carriage being mounted movable in translation according to the longitudinal direction on the frame between a first longitudinal position, in which the tray occupies the first position of use, and a second longitudinal position, wherein the tray occupies the second position of use, wherein the tray extends according to the longitudinal direction in the retracted configuration and extends according to a transverse direction in the deployed configuration, wherein the table further comprises a deployment arm connecting the carriage and the tray, a first articulation system and a second articulation system, the deployment arm being mounted movable in rotation about a second axis of rotation substantially parallel to the vertical axis on the carriage between a stored position and a deployment position by the first articulation system, the deployment arm extending according to the longitudinal direction in the stored position and according to the transverse direction in the deployment position the tray being mounted movable in rotation on the deployment arm between the retracted configuration and the deployed configuration by means of the second articulation system, wherein the deployment arm carries the guide element, the guide element being configured to cooperate with the guide support to guide the deployment arm between the stored position and the deployment position.

20. A support device for an aircraft cabin interior layout assembly, comprising:

a fixed frame extending according to a longitudinal direction; and a table comprising a tray deployable relative to the frame between a retracted configuration and a deployed configuration, wherein the tray extends horizontally in the retracted configuration and in the deployed configuration and is displaceable in rotation about a first axis of rotation substantially parallel to a vertical axis while remaining horizontal between the retracted configuration and the deployed configuration;

the tray being displaceable in translation relative to the frame according to the longitudinal direction between a first position of use and a second position of use when the tray is in the deployed configuration, while being fixed in rotation about the first axis of rotation, wherein the fixed frame comprises a first longitudinal stop and a second longitudinal stop limiting the displacement of the tray in translation according to the longitudinal direction, the table comprising a first complementary longitudinal stop configured to cooperate with the first longitudinal stop when the tray is in the first position of use and a second complementary longitudinal stop configured to cooperate with the second longitudinal stop when the tray is in the second position of use.

* * * * *